United States Patent [19]
Tachihara et al.

[11] Patent Number: 5,579,174
[45] Date of Patent: Nov. 26, 1996

[54] OBJECTIVE LENS FOR ENDOSCOPE

[75] Inventors: Satoru Tachihara; Tomohiko Kanzaki, both of Tokyo, Japan

[73] Assignee: Asahi Kogaku Kogyo Kabushiki Kaisha, Tokyo, Japan

[21] Appl. No.: 339,187

[22] Filed: Nov. 10, 1994

[30]   Foreign Application Priority Data

Nov. 12, 1993  [JP]  Japan ................................ 5-283618

[51] Int. Cl.$^6$ ............................................... G02B 9/12
[52] U.S. Cl. ................................. 359/784; 359/660
[58] Field of Search ................................. 359/656, 657, 359/658, 659, 663, 790, 793, 795, 661, 660, 784, 788, 645, 689, 716

[56]   References Cited

U.S. PATENT DOCUMENTS

| | | | |
|---|---|---|---|
| 4,037,938 | 7/1977 | Yamashita et al. | 359/734 |
| 4,042,295 | 8/1977 | Yamashita et al. | 359/740 |
| 4,059,344 | 11/1977 | Yamashita | 359/783 |
| 4,403,837 | 9/1983 | Nakahashi | 359/740 |
| 4,493,537 | 1/1985 | Nakahashi | 359/740 |
| 4,674,844 | 6/1987 | Nishioka et al. | 359/740 |
| 4,764,001 | 8/1988 | Yokota | 359/740 |
| 4,806,001 | 2/1989 | Okabe et al. | 359/740 |
| 4,867,546 | 9/1989 | Nishioka et al. | 359/740 |
| 4,979,808 | 12/1990 | Yamagata et al. | 359/740 |
| 5,050,974 | 9/1991 | Yakasugi et al. | 359/740 |
| 5,087,989 | 2/1992 | Igarashi | 359/740 |
| 5,175,650 | 12/1992 | Takayama et al. | 359/740 |
| 5,198,931 | 3/1993 | Igarashi | 359/740 |
| 5,208,702 | 5/1993 | Shiraiwa | 359/740 |
| 5,223,982 | 6/1993 | Suzuki et al. | 359/740 |
| 5,296,971 | 3/1994 | Mori | 359/740 |

FOREIGN PATENT DOCUMENTS

461554  2/1937  United Kingdom ................. 359/784

*Primary Examiner*—David C. Nelms
*Assistant Examiner*—Dawn-Marie Bey
*Attorney, Agent, or Firm*—Greenblum & Bernstein P.L.C.

[57]   ABSTRACT

An objective lens for an endoscope includes a first lens group of a positive power having a plurality of lenses, and a second lens group of a negative power. The first lens group is provided with a negative first lens located adjacent to an object to be photographed. The objective lens meets the requirements defined by (1) $0.6 < f_F/f < 1.0$, (2) $-6.0 < f_s/f < -1.0$, and (3) $1.0 < L_D/f < 4.0$, where $f_F$ designates a focal length of the first lens group, $f_s$ designates a focal length of the second lens group, f designates a focal length of the whole lens system, and $L_D$ designates a sum of the whole lens length and back focal distance.

14 Claims, 5 Drawing Sheets

OBJECTIVE LENS FOR ENDOSCOPE

BACKGROUND OF THE INVENTION

1. Field of the Invention

The present invention relates to an objective lens for a medical or industrial endoscope.

2. Description of Related Art

In a conventional objective lens for an endoscope, a first lens group on the object side is comprised of one negative lens (or a lens group having a negative power), and a lens group(s) having a positive power is provided behind the first lens group mainly to increase the angle of view, as in a retrofocus type lens arrangement. In such a retrofocus type lens system, light emitted from the first lens group is naturally divergent light, and the distance from the front surface of the first lens group to the image surface is usually long.

A medical endoscope that is inserted in a human body should be made as small as possible. The same is true for an industrial endoscope to facilitate the manipulation thereof. To this end, it is necessary to minimize the diameter and the whole length of the objective lens. However, in the conventional objective lens as mentioned above, there is a restriction to the minimization thereof.

Moreover, attempts have been made to realize more compact and smaller CCD's in the field of electronic endoscopes to thereby reduce the size of the endoscope. In general, in an electronic endoscope, an actual image circle produced by the objective lens needs to be larger than an actual image circle, because of a possible mechanical deviation of the optical axis of the objective lens from center of light receiving surface of the CCD. Since the deviation is substantially independent of the size of the CCD, an expected percentage deviation increases as the size of the CCD decreases, but is a function of the overall length of the objective lens.

For instance, in the case of a CCD having a diagonal length of 2.4 mm, the image circle of the objective lens is 2.4 mm. Assuming that the deviation is 0.1 mm, the image circle necessary for the objective lens is 2.6 mm. The ratio of 0.2 and 2.4 is 8.3% (0.2/2.4=8.3%). For a CCD whose diagonal length is 1.3 mm, the ratio is 15.4% (0.2/1.3=15.4%), this is a severe limitation on the objective lens.

Consequently, as the size of the CCD decreases, the image circle for the objective lens does not proportionally decrease as a relative percentage increases. The whole lens length must be as short as possible, in accordance with the minimization of the CCD.

In general, in an electronic endoscope, there is a glass cover in front of the front surface of the CCD. To prevent a physical interference between the glass cover and the objective lens, it is necessary for the objective lens to have a long back focal distance. Since the thickness of the glass cover has little or no relation to the size of the CCD, the back focal distance increases as the size of the CCD reduces (i.e., focal length of the objective lens decreases), which invites a difficulty upon design.

In summary, in an electronic endoscope having a small size CCD, there are incompatible requirements that the image circle must be relatively increased; the whole lens length must be reduced; and the back focal distance must be increased.

SUMMARY OF THE INVENTION

Accordinaly it is an object of the present invention to provide an objective lens for an endoscope which meets the above mentioned requirements, i.e., which has a decreased distance between the first surface of the lens and the image surface, an increased back focal distance, and an increased image circle.

To achieve the object mentioned above, according to the present invention, there is provided an objective lens for an endoscope comprising a first lens group of a positive power having a plurality of lenses, and a second lens group of a negative power, the first lens group being provided with a negative first lens located adjacent to an object to be photographed, wherein the objective lens satisfies the following relationship:

$$0.6 < f_F/f < 1.0; \quad (1)$$

$$-6.0 < f_S/f < -1.0; \quad (2)$$

and $$1.0 < L_D/f < 4.0; \quad (3)$$

wherein $f_F$ designates a focal length of the first lens group, $f_S$ designates a focal length of the second lens group, $f$ designates a focal length of the whole lens system, and $L_D$ designates a sum of the whole lens length and back focal distance.

Preferably, the objective lens satisfies the following relationship:

$$-3.0 < f_1/f < -0.8, \quad (4)$$

wherein $f_1$ focal length of the first lens of the first lens group.

The first lens group can be comprised of a negative first lens and at least one positive lens, in this order from the object side. In the simplest arrangement, the first lens group is comprised of one negative lens and one positive lens in this order from the object side.

The second lens group can be comprised of at least one positive lens and at least one negative lens. In the simplest arrangement, the second lens group is comprised of one positive lens and one negative lens.

preferably, the one positive lens and one negative lens belonging to the second lens group are constituted by one cemented lens to satisfy the following formula (5):

$$0.4 < |R_B|/f < 1.0, \quad (5)$$

wherein $R_B$ designates a radius of curvature of the connecting surface of the cemented lens.

Preferably, the positive lens and the negative lens cemented thereto satisfy the following formula (6);

$$0.1 < n_N - n_P, \quad (6)$$

wherein $n_N$ designates a refractive index of the negative lens of the cemented lens, and $n_P$ designates a refractive index of the positive lens of the cemented lens According to another aspect of the present invention, there is provided an objective lens for an endoscope comprising a first lens of a negative power, a second lens of a positive power, and a third lens group of a negative power, arranged in this order from an object side, wherein the third lens group consists of a lens of a positive power and a lens of a negative power, arranged in this order from an object side and cemented to each other.

The present disclosure relates to subject matter contained in Japanese patent application No. 5-283618(filed on Nov. 12, 1993) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

The significant features of the present invention reside in a telephoto lens type structure or the like in which there is a first lens group of a positive power, in order to increase the angle of view the first lens group includes a negative first lens and a second lens group, arranged in this order from the object side, the second lens group having a negative power.

Since the first lens group having a positive power includes a first lens which has a negative power, the second principal point of the first lens group is moved rearward, so that the inherent effects of the telephoto lens type structure are not necessarily achieved. However, the second principal point of the whole lens system is moved forward by the provision of the second lens group having a negative power. Hence, the ratio of the whole lens length to the focal length can be reduced. In addition to the foregoing, the back focal distance can be increased.

Formula (1) specifies the power of the first lens group. It is necessary for the first lens group to have a relatively strong power in order to achieve the technical effects of the telephoto type lens system. If the value of the ratio defined in the formula (1) is above the upper limit, the power is too weak to fulfill the effects. Conversely, if the value is smaller than the lower limit, the power is so strong that the negative power of the second lens group is too strong. Consequently, the high-order aberration occurs, and a Petzval sum is too small to correct the curvature of the field. This deteriorates the optical efficiency of the objective lens. Furthermore, the back focal distance is insufficient.

Formula (2) specifies the power of the second lens group to miniaturize the whole lens system, in connection with the formula (1). It is necessary to increase the power of the second lens group to some extent. If the value of the formula (2) is smaller than the lower limit, the power is too small to allow a reduction in the whole lens length. Conversely, if the value of formula (2) is larger than the upper limit, the power is so strong that an over correction of the spherical aberration and chromatic aberration occurs. Furthermore, the Petzval sum is too small to correct the curvature of the field, thus resulting in a deterioration of the quality of the objective lens.

Even if the objective lens meets the requirements defined by formulae (1) and (2), the whole lens length may slightly vary depending on the lens thickness or the distance between the lenses, etc. Formula (3) defines the requirement to obtain an optimum lens thickness or distance between the lenses. If the lens length is too long with respect to the focal length, no lens or lens frame can be easily produced, since the optical performance can be considerably influenced by manufacturing errors. The lower limit in formula (3) is chosen to take this into account.

If the ratio defined in the formula (3) exceeds the upper limit, it is difficult to realize a compact endoscope.

To obtain a large back focal distance, it is preferred to satisfy formula (4) which specifies the power of the first lens of the first lens group. If the ratio defined in formula (4) is above the upper limit, the power of the first lens is too strong to realize a compact lens system, since the whole lens length is increased, although the strong power of the first lens is advantageous to increase the back focal distance. Furthermore, excess spherical aberration and chromatic aberration occur, and the Petzval sum is too small to correct the curvature of the field. If the value of the ratio is below the lower limit, the power is too weak to obtain a large back focal distance.

To obtain an optimum optical performance, it is preferable that the first lens group is positive including a first negative lens and at least one positive lens, and that the second lens group is negative and comprised of one positive lens and one negative lens. With this arrangement, since each of the first and second lens groups includes at least one positive lens and at least one negative lens, the aberrations can be cancelled in each lens group to some extent, so that the aberrations, and particularly the transverse chromatic aberration can be effectively corrected in the whole lens system.

Moreover, in order to enhance the compactness and obtain a good optical performance, it is preferable that the first lens group be comprised of one negative lens and one positive lens in this order from the object side, and that the second lens group be comprised of one positive lens and one negative lens, respectively. With the optical arrangement made of the four lenses, not only can the whole lens length be minimized, but also the various aberrations, such as curvature of the field, astigmatism, chromatic aberration can be restricted to a desirable level while keeping a wide angle of view.

In an objective lens for an endoscope in which the focal length is short, the aberrations tend to be small as the focal length is reduced. Nevertheless, attention must be paid to the correction of the curvature of the field, astigmatism, and chromatic aberration. If an optical fiber to be used for an associated endoscope has a small diameter or the size of the pixels of the CCD to be incorporated in an associated electronic endoscope is small, then the objective lens needs to have a higher performance, and the aberrations (and in particular the chromatic aberration) must be correctly compensated. To this end, the one positive lens and the one negative lens belonging to the second lens group are made of a cemented lens which satisfies the following formula (5):

$$0.4 < |R_S|/f < 1.0, \quad (5)$$

wherein $R_B$ designates a radius of curvature of the mating surface of the cemented lens.

preferably, glass materials of which the lenses to be cemented to each other have refractive indexes that satisfy the following formula (6):

$$0.1 < n_N - n_P, \quad (6)$$

wherein $n_N$ designates the refractive index of the negative lens of the cemented lens belonging to the second lens group, and $n_P$ designates the refractive index of the positive lens of the cemented lens, respectively.

Five specific embodiments of the present invention will be discussed below. In all five embodiments, the first lens group 11 is comprised of a first negative lens 11-1 and a positive lens 11-2 which is located on the side opposite to the negative lens 11-1 with respect to a diaphragm S. The second lens group 12 is made of a cemented lens consisting of a negative lens 12-1 and a positive lens 12-2. There is a glass cover 13 for a CCD, which is made of two cemented parallel plates, behind the second lens group 12. The present invention can be equally applied to an optical arrangement having no glass cover 13.

FIRST EMBODIMENT

Figure 1:
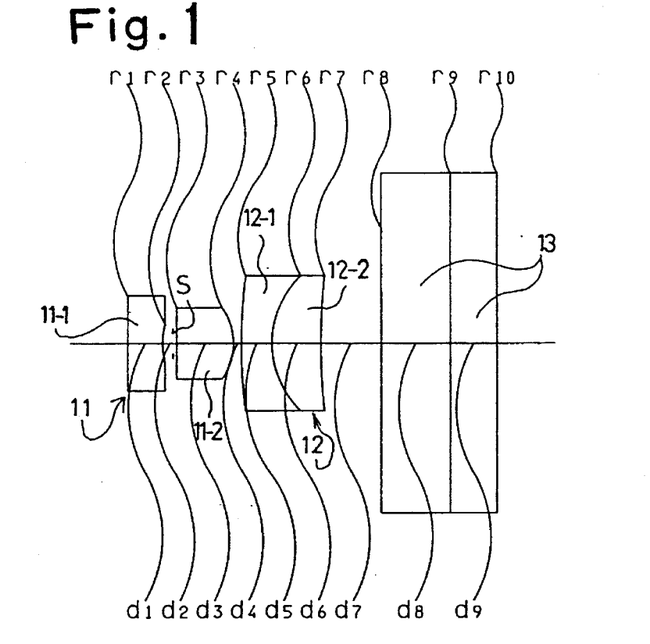
FIG. 1 is a schematic view of a lens arrangement of an objective lens for an endoscope, according to a first embodiment of the present invention.

FIG. 1 shows a lens arrangement of an objective lens, according to a first embodiment of the present invention.

Numerical data of the objective lens shown in FIG. 1 is shown in Table 1 below. Diagrams of various aberrations thereof are shown in FIG. 2.

Figure 2:
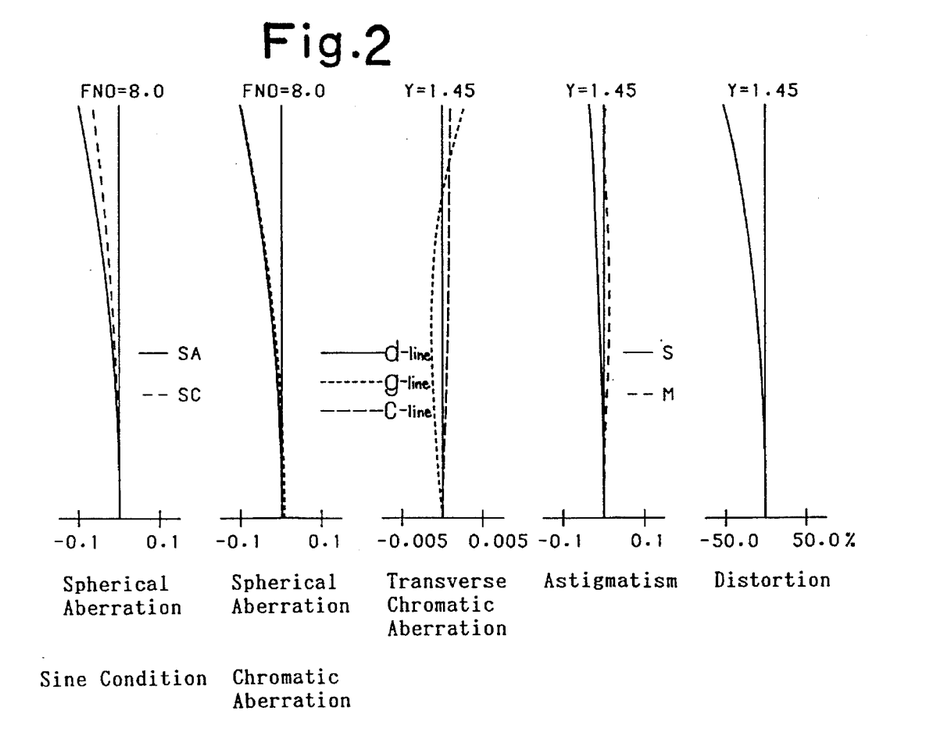
FIG. 2 shows various aberration diagrams of the objective lens shown in FIG. 1.

In FIG. 2, "SA" designates a spherical aberration, "SC" designates a sine condition "d-line" "g-line" and "C-line" the chromatic aberration represented by the spherical aberration and a transverse chromatic aberration, at the respective wavelengths, "S" designates a sagittal ray, and "M" designates a meridional ray, respectively.

In the tables and the drawings, "$F_{no}$" designates f-number, "f" designates a focal length, "ω" designates a half angle of view, "f" designates a back-focal distance including a glass cover, "R" designates a radius of curvature of each lens surface, "D" designates a lens thickness or the distance between the lenses, "N" designates a refractive index of designates a d-line, and "ν" the Abbe number of the d-line, respectively.

TABLE 1

$F_{NO} = 1:8.0$
$f = 1.22$
$M = -0.106$
$\omega = 66.8°$
$f_B = D_7 + D_8 + D_9 = 1.52$

| surface No. | R | D | N | ν |
|---|---|---|---|---|
| 1 | ∞ | 0.30 | 1.51633 | 64.1 |
| 2 | 0.558 | 0.09 | — | — |
| STOP | ∞ | 0.03 | — | — |

TABLE 1-continued

| | | | | |
|---|---|---|---|---|
| 3 | 95.897 | 0.50 | 1.72916 | 54.7 |
| 4 | −0.502 | 0.07 | — | — |
| 5 | 4.344 | 0.26 | 1.80518 | 25.4 |
| 6 | 0.780 | 0.42 | 1.51633 | 64.1 |
| 7 | 4.799 | 0.52 | — | — |
| 8 | ∞ | 0.60 | 1.53000 | 50.0 |
| 9 | ∞ | 0.40 | 1.54000 | 40.0 |
| 10 | ∞ | — | — | — |

SECOND EMBODIMENT

Figure 3:
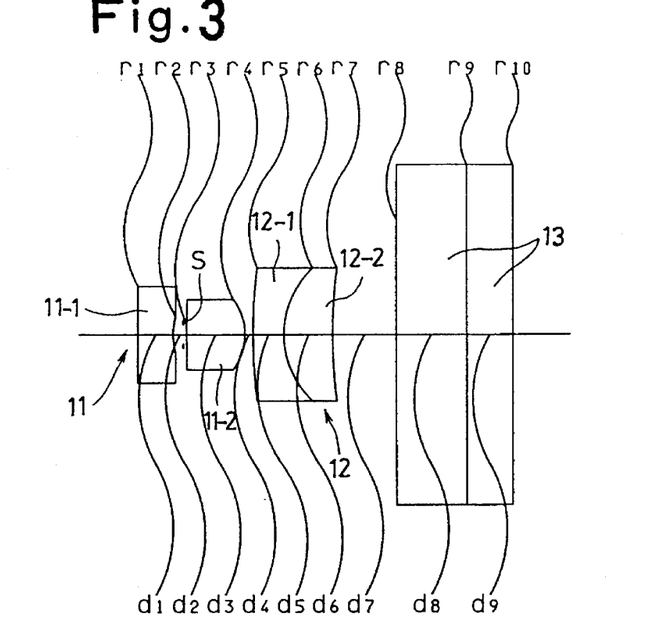
FIG. 3 is a schematic view of a lens arrangement of an objective lens for an endoscope, according to a second embodiment of the present invention.

FIG. 3 shows a lens arrangement of an objective lens, according to a second embodiment of the present invention.

Figure 4:
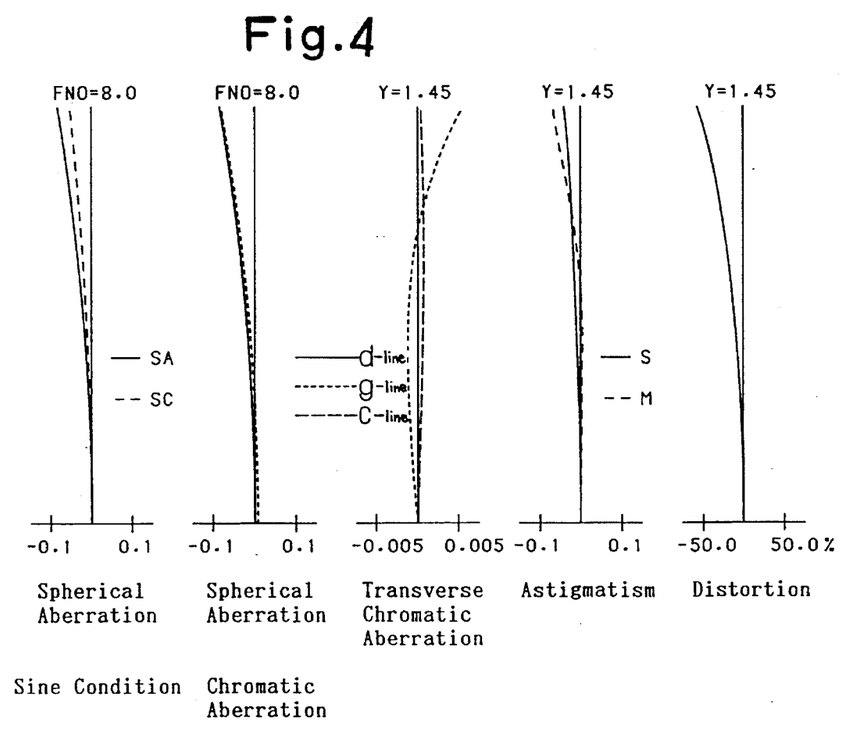
FIG. 4 shows various aberration diagrams of the objective lens shown in FIG. 3.

Numerical data of the lens system shown in FIG. 3 is shown in Table 2 below. Diagrams of various aberrations thereof are shown in FIG. 4.

TABLE 2

$F_{NO} = 1:8.0$
$f = 1.22$
$M = -0.106$
$\omega = 69.0°$
$f_B = D_7 + D_8 + D_9 = 1.54$

| surface No. | R | D | N | ν |
|---|---|---|---|---|
| 1 | ∞ | 0.30 | 1.51633 | 64.1 |
| 2 | 0.559 | 0.09 | — | — |
| STOP | ∞ | 0.03 | — | — |
| 3 | −43.066 | 0.50 | 1.72916 | 54.7 |
| 4 | −0.509 | 0.07 | — | — |
| 5 | 4.609 | 0.26 | 1.80518 | 25.4 |
| 6 | 0.768 | 0.42 | 1.58313 | 59.4 |
| 7 | 4.212 | 0.54 | — | — |
| 8 | ∞ | 0.60 | 1.53000 | 50.0 |
| 9 | ∞ | 0.40 | 1.54000 | 40.0 |
| 10 | ∞ | — | — | — |

THIRD EMBODIMENT

Figure 5:
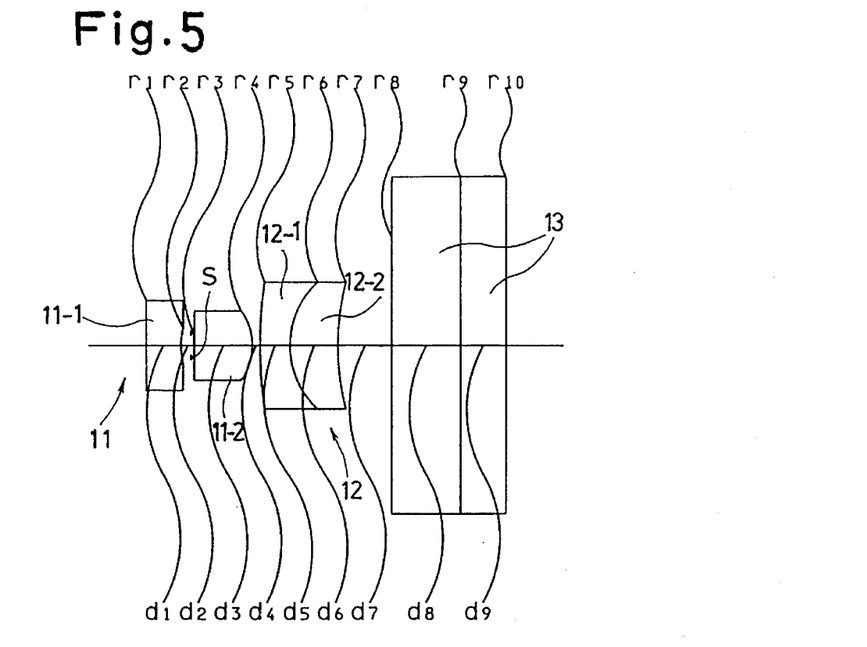
FIG. 5 is a schematic view of a lens arrangement of an objective lens for an endoscope, according to a third embodiment of the present invention.

FIG. 5 shows a lens arrangement of an objective lens, according to a third embodiment of the present invention.

Figure 6:
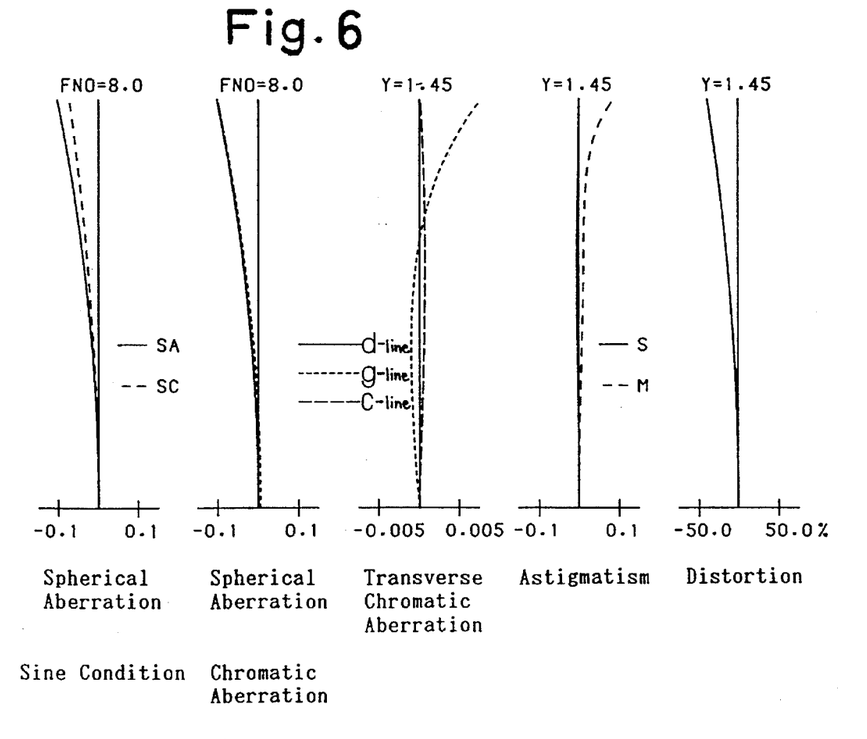
FIG. 6 shows various aberration diagrams of the objective lens shown in FIG. 5.

Numerical data of the lens system shown in FIG. 5 is shown in Table 3 below. Diagrams of various aberrations thereof are shown in FIG. 6.

TABLE 3

$F_{NO} = 1:8.0$
$f = 1.22$
$M = -0.107$
$\omega = 61.5°$
$f_B = D_7 + D_8 + D_9 = 1.47$

| surface No. | R | D | N | ν |
|---|---|---|---|---|
| 1 | ∞ | 0.30 | 1.51633 | 64.1 |
| 2 | 0.595 | 0.09 | — | — |
| STOP | ∞ | 0.03 | — | — |
| 3 | −13.701 | 0.50 | 1.72916 | 54.7 |
| 4 | −0.493 | 0.07 | — | — |
| 5 | 3.641 | 0.26 | 1.80518 | 25.4 |
| 6 | 0.715 | 0.42 | 1.58313 | 59.4 |
| 7 | 2.073 | 0.47 | — | — |
| 8 | ∞ | 0.60 | 1.53000 | 50.0 |
| 9 | ∞ | 0.40 | 1.54000 | 40.0 |
| 10 | ∞ | — | — | — |

FOURTH EMBODIMENT

Figure 7:
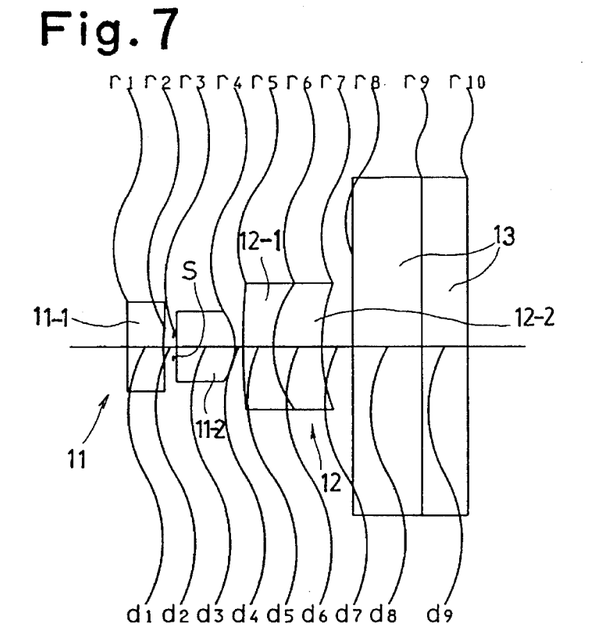
FIG. 7 is a schematic view of a lens arrangement of an objective lens for an endoscope, according to a fourth embodiment of the present invention.

FIG. 7 shows a lens arrangement of an objective lens, according to a fourth embodiment of the present invention.

Figure 8:
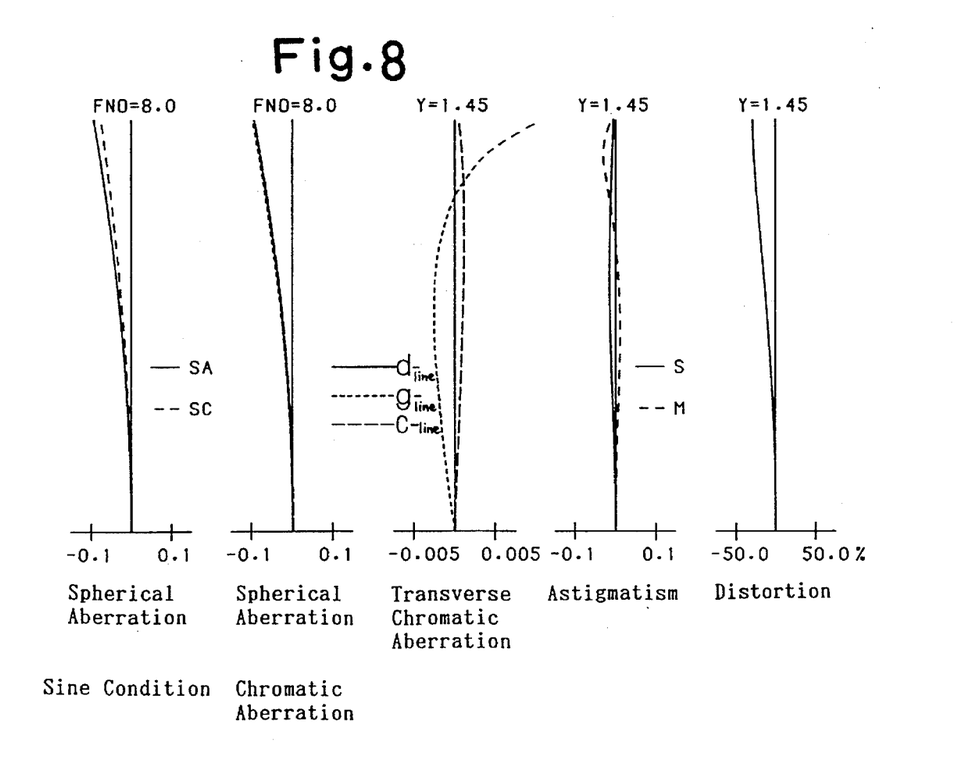
FIG. 8 shows various aberration diagrams of the objective lens shown in FIG. 7.

Numerical data of the lens system shown in FIG. 7 is shown in Table 4 below. Diagrams of various aberrations thereof are shown in FIG. 8.

TABLE 4

$F_{NO} = 1:8.0$
$f = 1.16$
$M = -0.102$
$\omega = 58.5°$
$f_B = D_7 + D_8 + D_9 = 1.27$

| surface No. | R | D | N | ν |
|---|---|---|---|---|
| 1 | ∞ | 0.30 | 1.51633 | 64.1 |
| 2 | 1.006 | 0.09 | — | — |
| STOP | ∞ | 0.03 | — | — |
| 3 | -4.149 | 0.50 | 1.72916 | 54.7 |
| 4 | -0.499 | 0.07 | — | — |
| 5 | 5.555 | 0.26 | 1.80518 | 25.4 |
| 6 | 0.866 | 0.42 | 1.69680 | 55.5 |
| 7 | 1.459 | 0.27 | — | — |
| 8 | ∞ | 0.60 | 1.53000 | 50.0 |
| 9 | ∞ | 0.40 | 1.54000 | 40.0 |
| 10 | ∞ | — | — | — |

FIFTH EMBODIMENT

Figure 9:
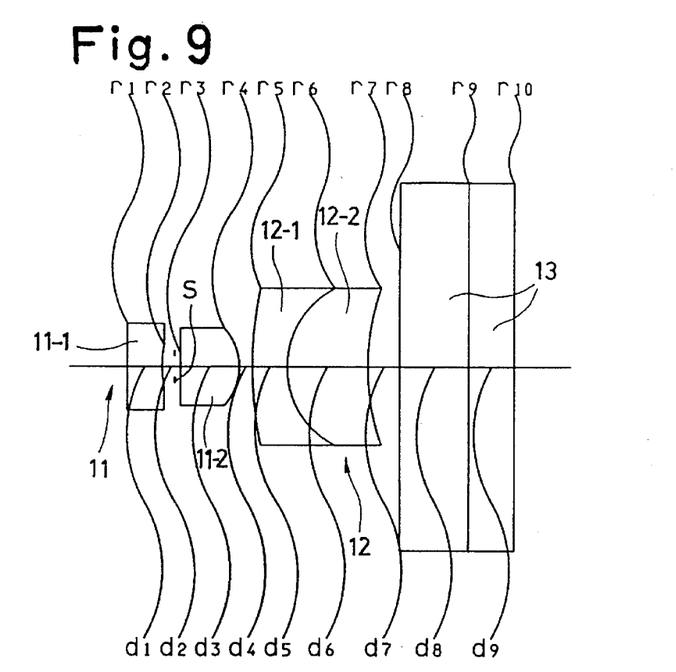
FIG. 9 is a schematic view of a lens arrangement of an objective lens for an endoscope, according to a fifth embodiment of the present invention.

FIG. 9 shows a lens arrangement of an objective lens, according to a fifth embodiment of the present invent ion.

Figure 10:
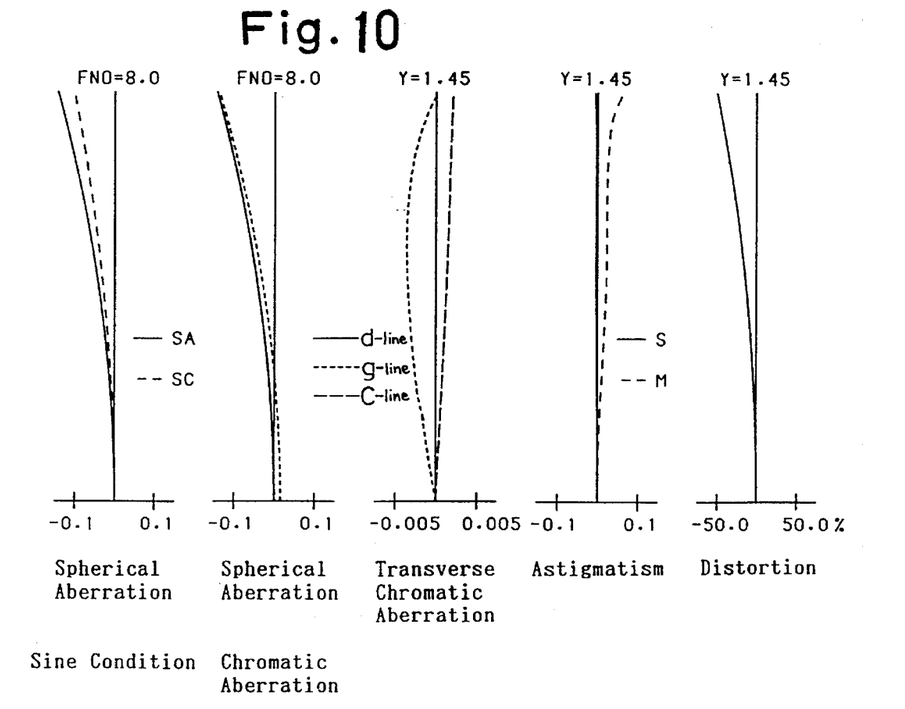
FIG. 10 shows various aberration diagrams of the objective lens shown in FIG. 9.

Numerical data of the lens system shown in FIG. 9 is shown in Table 5 below. Diagrams of various aberrations thereof are shown in FIG. 10.

TABLE 5

$F_{NO} = 1:8.0$
$f = 1.19$
$M = -0.104$
$\omega = 66.0°$
$f_B = D_7 + D_8 + D_9 = 1.28$

| surface No. | R | D | N | ν |
|---|---|---|---|---|
| 1 | ∞ | 0.30 | 1.88300 | 40.8 |
| 2 | 0.953 | 0.11 | — | — |
| STOP | ∞ | 0.05 | — | — |
| 3 | -4.460 | 0.51 | 1.72916 | 54.7 |
| 4 | -0.503 | 0.11 | — | — |
| 5 | 3.226 | 0.30 | 1.80518 | 25.4 |
| 6 | 0.752 | 0.70 | 1.58913 | 61.2 |
| 7 | 2.017 | 0.28 | — | — |
| 8 | ∞ | 0.60 | 1.53000 | 50.0 |
| 9 | ∞ | 0.40 | 1.54000 | 40.0 |
| 10 | ∞ | — | — | — |

The values of formulae (1) through (6) in each embodiment are shown in Table 6 below.

TABLE 6

| | formula (1) | formula (2) | formula (3) | formula (4) | formula (5) | formula (6) |
|---|---|---|---|---|---|---|
| Embodiment 1 | 0.761 | -2.88 | 2.62 | -0.887 | 0.639 | 0.289 |
| Embodiment 2 | 0.792 | -3.33 | 2.62 | -0.888 | 0.630 | 0.222 |
| Embodiment 3 | 0.746 | -2.29 | 2.54 | -0.945 | 0.586 | 0.222 |
| Embodiment 4 | 0.753 | -1.95 | 2.59 | -1.681 | 0.747 | 0.108 |
| Embodiment 5 | 0.821 | -2.73 | 2.93 | -0.909 | 0.632 | 0.216 |

As can be seen from Table 6 above, all five embodiments meet the requirements defined by formulae (1) through (6). Moreover, an objective lens for an endoscope according to the present invention can effectively correct the various aberrations.

As may be understood from the above discussion, according to the present invention, an objective lens for an endoscope having a short overall lens length, a long back focal distance and a large image circle can be obtained.

We claim:

1. An objective lens for an endoscope, comprising:

a first lens group of a positive power having a plurality of lenses, said first lens group having a negative first lens located adjacent to an object to be photographed; and a second lens group of a negative power, a first surface on an image side of said second lens group being a concave surface;

wherein said objective lens satisfies the following relationships:

$$0.6 < f_F/f < 1.0;$$

$$-6.0 < f_S/f < -1.0;$$

and $$1.0 < L_D/f < 4.0,$$

wherein $f_F$ designates a focal length of the first lens group $f_S$ designates a focal length of the second lens group f designates a focal length of the whole lens system $L_D$ designates a sum of the whole lens length and back focal distance.

2. An objective lens for an endoscope according to claim 1, said objective lens further satisfying the following relationship:

$$-3.0 < f_I/f < -0.8,$$

wherein $f_I$ designates a focal length of said first lens of said first lens group.

3. An objective lens for an endoscope according to claim 1, wherein said first lens group comprises a negative first lens and at least one positive lens, in this order from an object side, and said second lens group comprises at least one positive lens and at least one negative lens.

4. An objective lens for an endoscope according to claim 3, wherein said first lens group comprises one negative lens and one positive lens in this order from said object side, and said second lens group comprises one positive lens and one negative lens.

5. The objective lens for an endoscope according to claim 4, wherein said one negative lens and said one positive lens of said second lens group are cemented together and arranged in this order from an object side, and a surface of said one positive lens facing an image side being a concave surface.

6. An objective lens for an endoscope according to claim 3, wherein said one positive lens and one negative lens belonging to said second lens group constitute one cemented lens to satisfy the following formula:

$$0.4 < |R_S|/f < 1.0,$$

wherein $R_S$ designates a radius of curvature of a connecting surface of said cemented lens.

7. An objective lens for an endoscope according to claim 6, wherein said positive lens and said negative lens cemented together satisfy the following formula:

$0.1 < n_N - n_P,$ wherein $n_N$ designates a refractive index of said negative lens of said cemented lens, and $n_P$ designates a refractive index of said positive lens of said cemented lens.

8. An objective lens for an endoscope according to claim 2, wherein said first lens group comprises a negative first lens and at least one positive lens, in this order from an object side, and said second lens group comprises at least one positive lens and at least one negative lens.

9. An objective lens for an endoscope according to claim 8, wherein said first lens group comprises one negative lens and one positive lens in this order from said object side, and said second lens group comprises one positive lens and one negative lens.

10. An objective lens for an endoscope according to claim 9, wherein said one positive lens and said one negative lens belonging to said second lens group constitute one cemented lens that satisfies the following formula:

$0.4 < |R_S/f| < 1.0,$ wherein $R_S$ designates a radius of curvature of a connecting surface of said cemented lens.

11. An objective lens for an endoscope according to claim 10, wherein said positive lens and said negative lens cemented thereto satisfy the following formula:

$0.1 < n_N - n_P,$ wherein $n_N$ designates a refractive index of said negative lens of said cemented lens, and $n_P$ designates a refractive index of said positive lens of said cemented lens.

12. An objective lens for an endoscope, consisting of:

a first lens of a negative power, a second lens of positive power, and a third lens group of a negative power, arranged in this order from an object side, said third lens group consisting of a lens of a negative power and a lens of a positive power, arranged in this order from an object side and cemented to each other, a surface of said positive lens of said third lens group facing an image side being a concave surface.

13. The objective lens for an endoscope according to claim 5, said one positive lens of said second lens group being a meniscus lens.

14. The objective lens for an endoscope according to claim 12, said positive lens of said third lens group being a meniscus lens.

* * * * *

UNITED STATES PATENT AND TRADEMARK OFFICE
CERTIFICATE OF CORRECTION

PATENT NO.  : 5,579,174
DATED       : November 26, 1996
INVENTOR(S) : S. TACHIHARA et al.

It is certified that error appears in the above-indentified patent and that said Letters Patent is hereby corrected as shown below:

On the title page, item [56], "References Cited", "U.S. PATENT DOCUMENTS", add ---5,315,441 5/1994 Hori et al. 359/753---.

At column 8, line 40 (claim 2, line 5), change "$f_1$" to ---$f_1$---.

At column 8, line 62 (claim 6, line 5), change "$R_S$" to ---$R_8$---.

At column 8, line 64 (claim 6, line 6), change "$R_S$" to ---$R_8$---.

At column 9, line 22 (claim 10, line 5), change "$|R_S$" to ---$|R_8|$---.

At column 9, line 25 (claim 10, line 7), change "$R_S$" to ---$R_8$---.

Signed and Sealed this

Thirteenth Day of May, 1997

*Attest:*

BRUCE LEHMAN

*Attesting Officer*    *Commissioner of Patents and Trademarks*